United States Patent
Kurozuka

(10) Patent No.: US 8,780,096 B2
(45) Date of Patent: Jul. 15, 2014

(54) SCANNING IMAGE DISPLAY APPARATUS

(75) Inventor: Akira Kurozuka, Osaka (JP)

(73) Assignee: Panasonic Corporation, Osaka (JP)

( * ) Notice: Subject to any disclaimer, the term of this patent is extended or adjusted under 35 U.S.C. 154(b) by 537 days.

(21) Appl. No.: 13/143,974

(22) PCT Filed: Nov. 12, 2010

(86) PCT No.: PCT/JP2010/006678
§ 371 (c)(1),
(2), (4) Date: Jul. 11, 2011

(87) PCT Pub. No.: WO2011/061914
PCT Pub. Date: May 26, 2011

(65) Prior Publication Data
US 2011/0267361 A1    Nov. 3, 2011

(30) Foreign Application Priority Data

Nov. 19, 2009    (JP) ................................ 2009-263714

(51) Int. Cl.
| | |
|---|---|
| G06F 3/038 | (2013.01) |
| G09G 5/00 | (2006.01) |
| G06F 13/00 | (2006.01) |
| G09G 5/36 | (2006.01) |
| H04N 3/08 | (2006.01) |
| H04N 9/31 | (2006.01) |
| G02B 27/01 | (2006.01) |
| G02B 26/10 | (2006.01) |
| G09G 3/02 | (2006.01) |

(52) U.S. Cl.
CPC ............. *G02B 26/101* (2013.01); *H04N 3/08* (2013.01); *G06G 2360/18* (2013.01); *H04N 9/3135* (2013.01); *G02B 27/017* (2013.01); *G09G 2320/0247* (2013.01); *G09G 3/02* (2013.01); *G09G 2340/0435* (2013.01); *G02B 27/01* (2013.01)
USPC ........ 345/204; 345/7; 345/8; 345/9; 345/536; 345/545; 345/547

(58) Field of Classification Search
None
See application file for complete search history.

(56) References Cited

U.S. PATENT DOCUMENTS 6,583,912 B1    6/2003   Van Lerberghe
(Continued)

FOREIGN PATENT DOCUMENTS

| JP | 8-123355 | 5/1996 |
|---|---|---|
| JP | 2002-344765 | 11/2002 |

(Continued)

OTHER PUBLICATIONS

International Search Report issued Dec. 14, 2010 in International (PCT) Application No. PCT/JP2010/006678.

*Primary Examiner* — Maurice L McDowell, Jr.
*Assistant Examiner* — Donna J Ricks
(74) *Attorney, Agent, or Firm* — Wenderoth, Lind & Ponack, L.L.P.

(57) ABSTRACT

A scanning image display apparatus includes a light source unit (1) that emits a laser beam, a scanning mirror (3) that two-dimensionally scans the laser beam in a first direction and in a second direction that crosses the first direction at predetermined scanning frequencies, respectively, a frame buffer (5) that temporarily stores image data corresponding to images to be displayed on a display screen frame by frame, and a display controller (4) that generates display data used to modulate an intensity of the laser beam at a predetermined frame frequency using the read image data and causes the light source unit to emit the laser beam intensity-modulated based on the display data. The frame buffer is so configured that the respective image data of a plurality of different frames can be temporarily stored therein and read therefrom. The display controller reads the respective image data of the plurality of frames from the frame buffer and alternately switches the frames of the image data used for generation of the display data in synchronization with a scanning cycle of the scanning mirror.

10 Claims, 9 Drawing Sheets

(b) WHEN FRAMES ARE NOT SYNCHRONIZED

(56) References Cited

U.S. PATENT DOCUMENTS

| | | |
|---|---|---|
| 7,580,007 B2 | 8/2009 | Brown et al. |
| 7,692,836 B2 | 4/2010 | Yamazaki |
| 7,834,867 B2 * | 11/2010 | Sprague et al. ............... 345/204 |
| 2004/0004585 A1 | 1/2004 | Brown et al. |
| 2008/0136742 A1 * | 6/2008 | Tegreene et al. ................... 345/7 |
| 2008/0158632 A1 | 7/2008 | Yamazaki |
| 2009/0213040 A1 | 8/2009 | Brown et al. |
| 2009/0316116 A1 * | 12/2009 | Melville et al. ................ 353/31 |
| 2011/0001888 A1 * | 1/2011 | Brown et al. ................. 348/744 |
| 2013/0070209 A1 * | 3/2013 | Cantelobre ..................... 353/37 |

FOREIGN PATENT DOCUMENTS

| | | |
|---|---|---|
| JP | 2003-521722 | 7/2003 |
| JP | 2005-526289 | 9/2005 |
| JP | 2006-215201 | 8/2006 |
| JP | 2007-93644 | 4/2007 |
| JP | 2008-65310 | 3/2008 |
| JP | 4172627 | 8/2008 |
| JP | 2009-69311 | 4/2009 |

* cited by examiner

FIG. 2
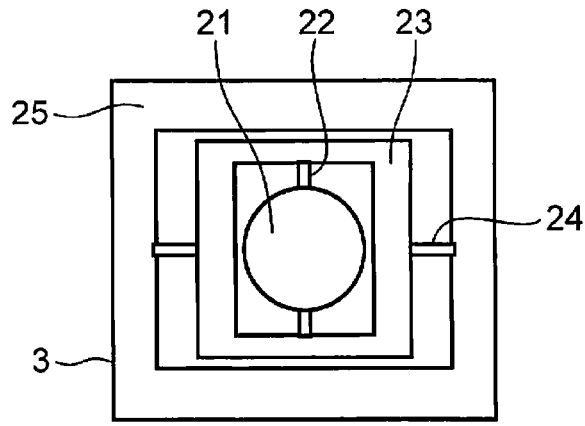
FIG. 3
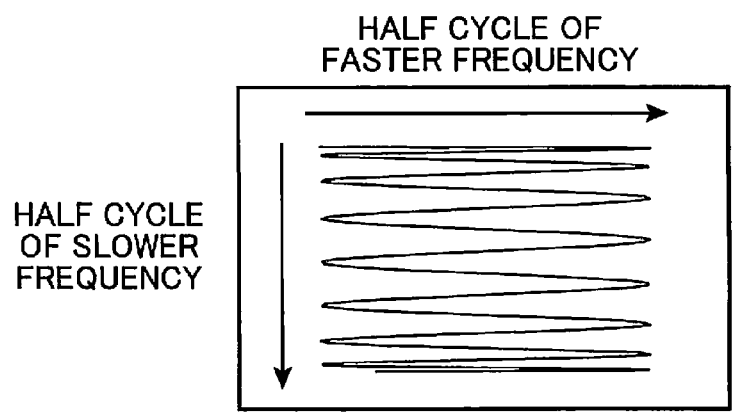
(a) TRACE OF HALF CYCLE OF SLOWER FREQUENCY
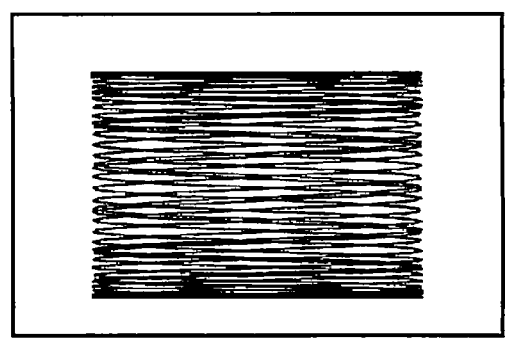
(b) TRACE OF SEVERAL CYCLES OF SLOWER FREQUENCY

FIG. 4
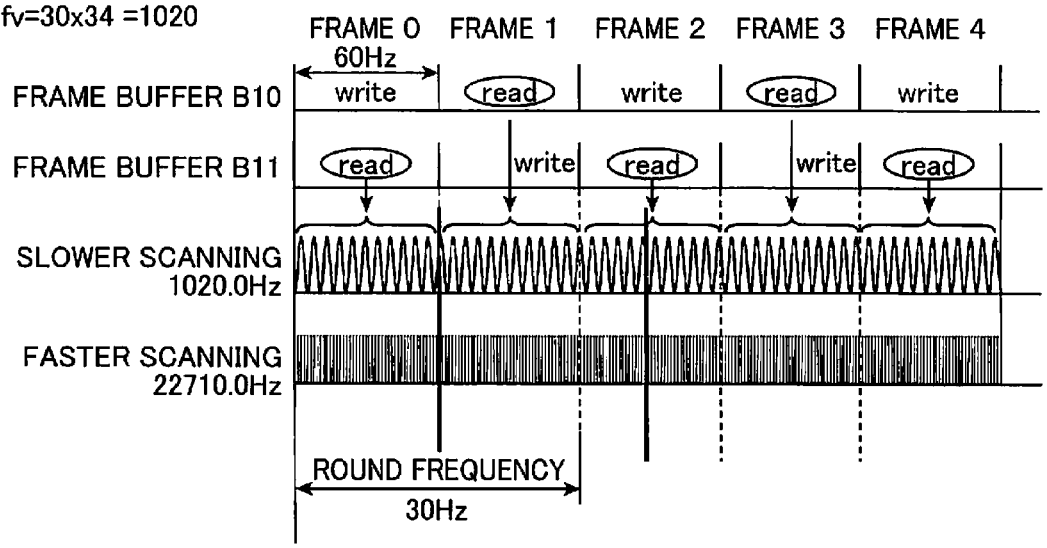
(a) WHEN FRAMES ARE SYNCHRONIZED
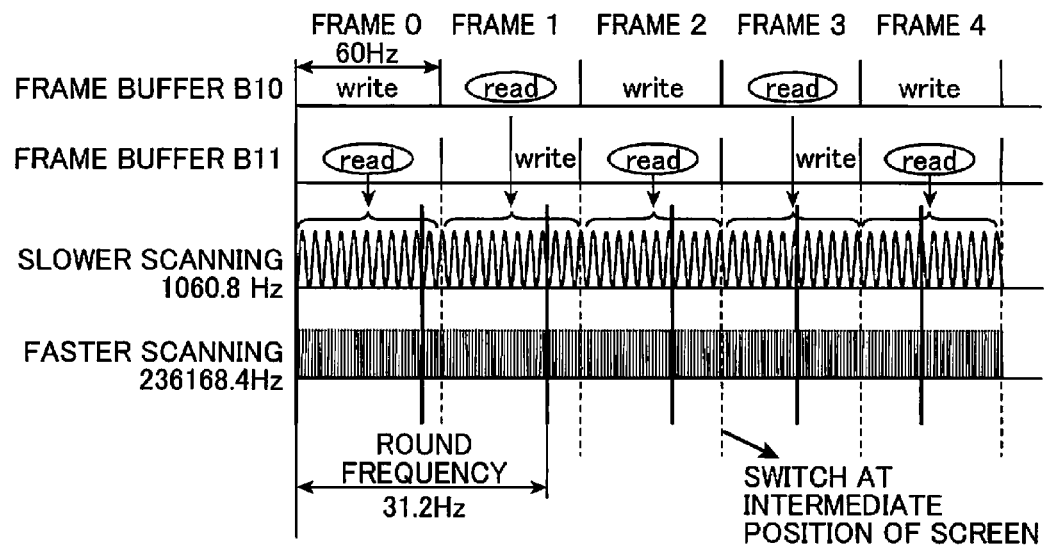
(b) WHEN FRAMES ARE NOT SYNCHRONIZED

SCANNING IMAGE DISPLAY APPARATUS

TECHNICAL FIELD

The present invention relates to a scanning image display apparatus which displays images by scanning a laser beam using a scanning mirror such as a laser projector, an HMD (head-mounted display) or an HUD (head-up display).

BACKGROUND ART

Image display apparatuses which display images by scanning a laser beam are expected to be developed since they have a wide color reproduction range and are capable of high contrast display by a simple construction. Particularly, they are suitable when miniaturization is required such as in the case of mobile projectors and HMDs.

For example, various methods including a method using a pixel display device such as a liquid crystal element or an organic EL as an image display and a method directly forming an image on the retinas of eyes by two-dimensionally scanning a laser beam have been proposed for image display apparatuses such as HMDs (head-mounted displays) which display images while being mounted on the head of a user.

Such image display apparatuses are required to be small in size and light in weight as a whole in order to reduce a mounting burden on a user to enable prolonged use. Further, if an image display apparatus is constructed in the same design as generally used spectacles, a user can act while constantly wearing the image display apparatus like normal spectacles.

However, as image quality and a view angle increase, an eyepiece optical system using a display, a prism for introducing light emitted from the display to the eyes and a half mirror becomes larger with a method using a pixel display device. Thus, miniaturization and weight saving are difficult.

Further, a large eyepiece optical system as described above is structured to cover the eyes and is shaped like a goggle or a helmet rather than spectacles. It is difficult to expect natural wear comfort and it is difficult to realize a general spectacle-type image display apparatus.

On the other hand, a retinal scanning image display apparatus using a laser scanning method has an advantage of being able to be made very small using a small-size MEMS (Micro-Electro-Mechanical-System) mirror device.

In an image display apparatus required to have a very small construction like the spectacle-type HMD described above, a resonant mirror with which a large displacement can be obtained by a small drive force is suitable. Further, a two-axis resonant MEMS mirror capable of two-axis scanning by one chip is most suitable.

Normally, upon scanning a laser beam by a scanning mirror, it is preferable to perform scanning at a high speed in a horizontal direction and perform scanning in accordance with a frame rate of moving images to be displayed, at 60 Hz for instance, in a vertical direction. If the scanning mirror is designed to resonate at such a low frequency, the rigidity of a spring structure for supporting the mirror is reduced and the mirror becomes very weak against disturbances such as vibration in many cases.

Given this situation, there has been proposed a method for resonantly driving a scanning mirror in two axes at a higher frequency, that is, a method for displaying by Lissajous scanning.

For example, in a disclosed relationship of frequency and phase when images are displayed by Lissajous scanning using two-axis resonant scanning, two-axis resonant frequencies are set at a ratio of relatively prime integers to make the frame rate of images and a round frequency of scanning integral multiples (see, for example, patent documents 1 and 2).

On the other hand, the resonant frequencies of the scanning mirror are determined by the mass of a movable portion and a spring constant of a supporting structure. It is difficult to produce the scanning mirror while accurately designating the resonant frequencies due to dimension and thickness variations in manufacturing.

Thus, it has been proposed to make the resonant frequencies themselves variable such as by providing a heating unit near a twist beam of a vibration mirror for heating (see, for example, patent document 3).

Alternatively, a method has been proposed which equalizes the numbers of scanning lines by temporarily stopping scanning by a vertical scanner during a period until a horizontal scanning start signal corresponding to a vertical synchronization signal of a video signal in a second frame is input after scanning by a horizontal scanner in a first frame is finished, thereby realizing synchronization with the frame rate (see, for example, patent document 4).

However, the conventional constructions as described above have the following problems.

In the scanning display apparatus using the two-axis resonant mirror, since it is difficult to synchronize a cycle of scanning to image the entire screen and the frame rate of moving images, the frames are switched during screen scanning. Thus, frame boundaries appear particularly in images with quick and rushed movements and discontinuity is viewed at a specific position of the screen in some cases.

If the mechanism for making the resonant frequencies variable is provided, the device becomes complicated and additional power is necessary, which undermines characteristics of small size and power saving.

Resonantly driven devices are incapable of making special movements for synchronization such as temporary stop of slower scanning.

Patent Document 1: Japanese Translation of PCT International Application No. 2005-526289
Patent Document 2: Japanese Unexamined Patent Publication No. 2007-093644
Patent Document 3: Japanese Patent No. 4172627
Patent Document 4: Japanese Unexamined Patent Publication No. 2008-065310

SUMMARY OF THE INVENTION

An object of the present invention is to make frame boundaries inconspicuous and to enable good image display using a scanning mirror which two-dimensionally scans taking advantage of characteristics of a scanning image display apparatus which are small in size and power saving.

A scanning image display apparatus according to one aspect of the present invention includes: a light source unit that emits a laser beam; a scanning mirror that two-dimensionally scans the laser beam in a first direction and in a second direction that crosses the first direction at predetermined scanning frequencies, respectively; a frame buffer that temporarily stores image data corresponding to images to be displayed on a display screen frame by frame; and a display controller that reads the image data from the frame buffer, generates display data used to modulate an intensity of the laser beam at a predetermined frame frequency using the read image data, and causes the light source unit to emit the laser beam intensity-modulated based on the display data, wherein the frame buffer is so configured that the respective image data of a plurality of different frames can be temporarily stored therein and read therefrom, and the display controller reads the respective image data of the plurality of frames from the frame buffer and alternately switches the frames of the image data used for generation of the display data in synchronization with a scanning cycle of the scanning mirror.

According to this construction, the image data corresponding to the images to be displayed on the display screen are temporarily stored frame by frame in the frame buffer. The display controller reads the image data from the frame buffer and generates the display data used to modulate an intensity of the laser beam at the predetermined frame frequency using the read image data, and the laser beam intensity-modulated based on the display data is emitted from the light source unit. Further, the laser beam is two-dimensionally scanned in the first direction and in the second direction that crosses the first direction at the predetermined scanning frequencies respectively.

Here, the frame buffer is configured such that the image data of the plurality of different frames can be temporarily stored therein and read therefrom. The display controller reads the respective image data of the plurality of different frames from the frame buffer and alternately switches the frames of the image data used for generation of the display data in synchronization with the scanning frequency of the scanning mirror.

Therefore, even if the frame frequency and the scanning frequencies of the scanning mirror are not synchronized, the frames of the image data used for generation of the display data are alternately switched in synchronization with the scanning cycle of the scanning mirror, and accordingly, frame boundaries do not appear on the display screen displaying the images. As a result, good images can be displayed.

Other objects, features and merits of the present invention will become more apparent upon reading the following description. Further, advantages of the present invention will become more apparent upon reading the following description along with the accompanying drawings.

BRIEF DESCRIPTION OF THE DRAWINGS

FIG. 2 is a plan view showing a schematic construction of a scanning mirror.

FIG. 3 are plan views showing traces of beams scanned by the scanning mirror.

FIG. 4 are explanatory charts showing the operation of a conventional scanning image display apparatus.

DESCRIPTION OF EMBODIMENTS

Hereinafter, embodiments of the present invention are described with reference to the drawings. Note that the following embodiments are specific examples of the present invention and not of the nature to limit the technical scope of the present invention.

First Embodiment

Figure 1:
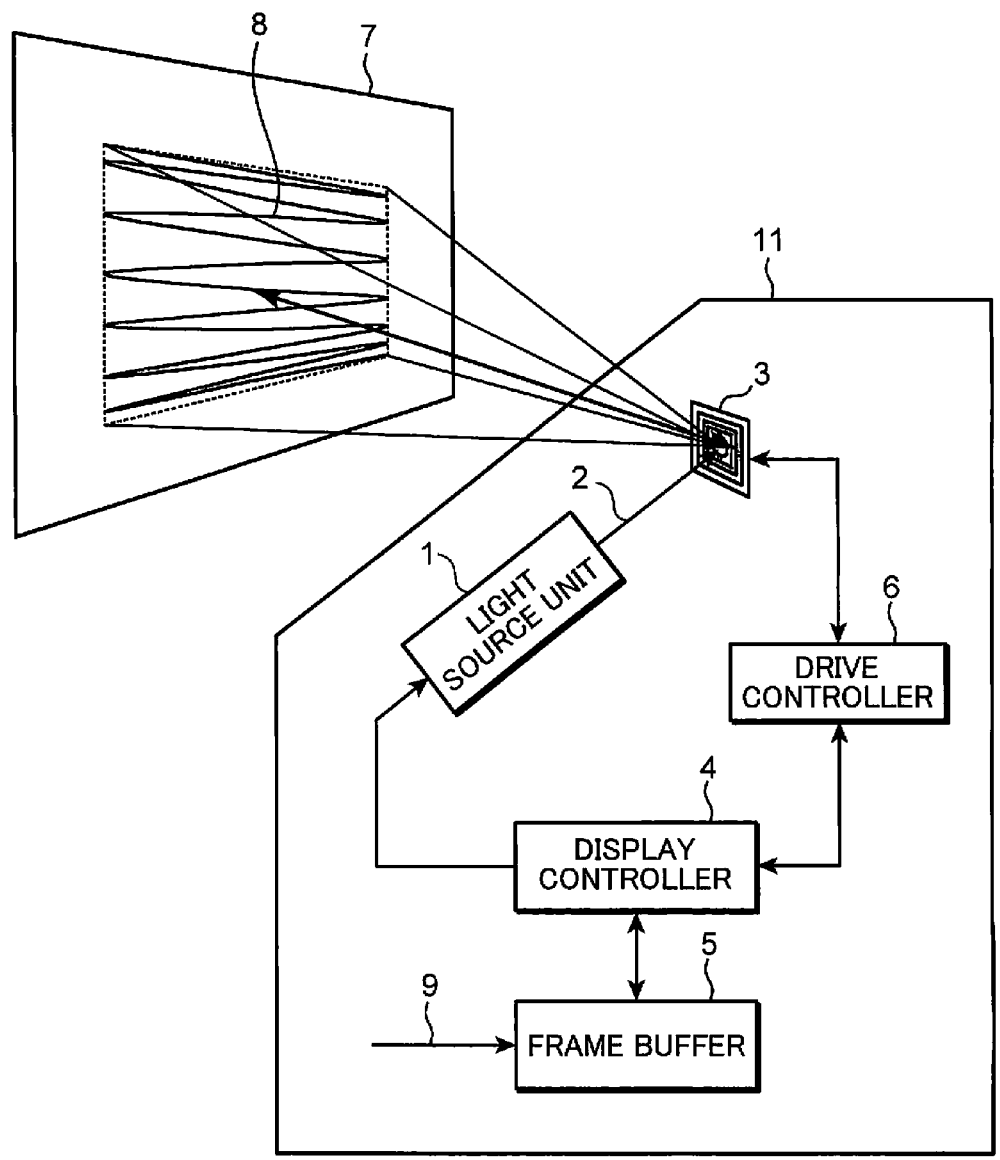
FIG. 1 is an explanatory diagram showing a schematic construction of a scanning image display apparatus according to a first embodiment of the invention.
Figure 9:
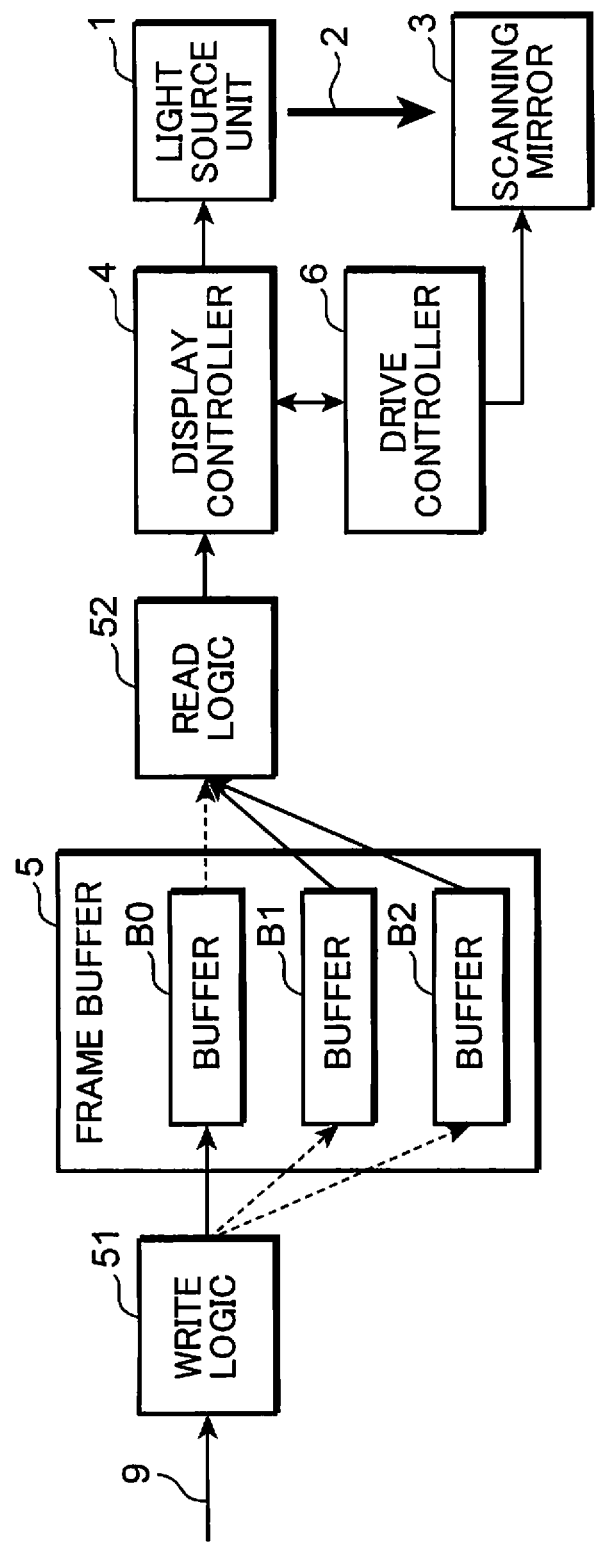
FIG. 9 is a block diagram showing a control construction of the scanning image display apparatus according to the first embodiment of the invention.

Hereinafter, a first embodiment of the present invention is described with reference to the drawings. First, respective constituent members of a scanning image display apparatus according to the first embodiment are described. FIG. 1 is a diagram showing a schematic construction of the scanning image display apparatus according to the first embodiment and FIG. 9 is a block diagram showing a control construction of this scanning image display apparatus.

The scanning image display apparatus 11 in the first embodiment includes a light source unit 1, a scanning mirror 3 (scanning unit), a display controller 4, a frame buffer 5 and a drive controller 6 as shown in FIG. 1.

The light source unit 1 includes unillustrated laser light source, collimator lens, condenser lens, etc. A laser beam 2 emitted from the light source unit 1 is reflected by the scanning mirror 3 to be deflected and projected to a projection surface 7 (display screen).

Figure 7A:
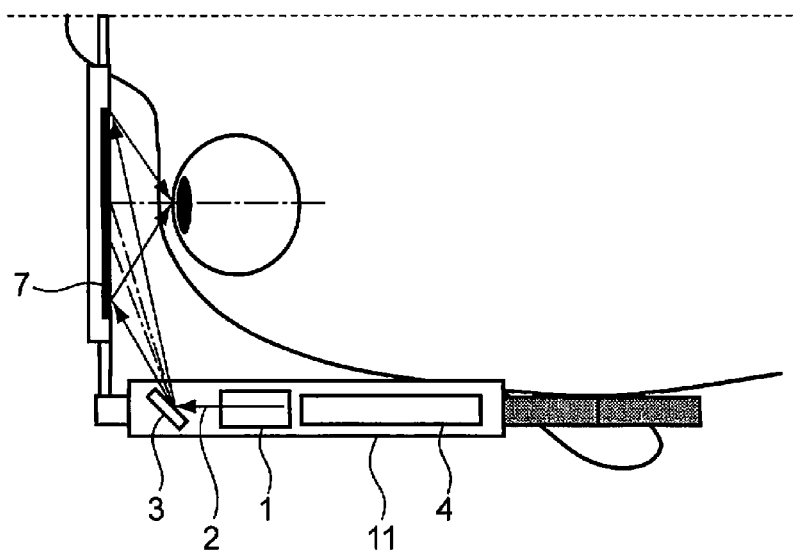
FIG. 7 are diagrams showing a construction example of the scanning image display apparatus, (a) is a plan view of a main section, and (b) is a side view.
Figure 7B:
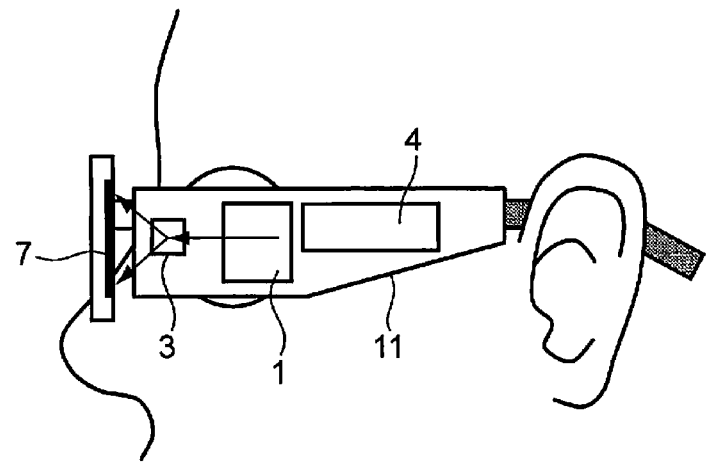
Figure 8:
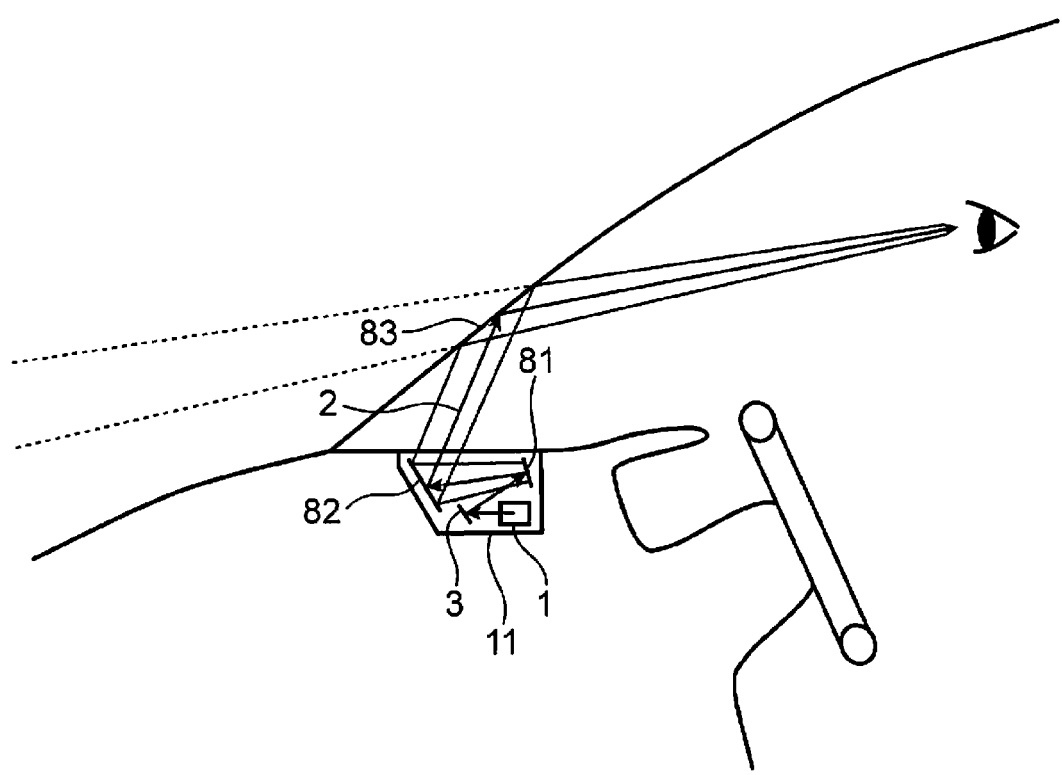
FIG. 8 is a side view showing an essential part of a construction example of the scanning image display apparatus.

For example, in the case of a scanning image display apparatus in the form of a spectacle-type HMD shown in FIG. 7, hologram mirrors formed on surfaces of spectacle lenses serve as the projection surface 7. Further, in the case of an HUD constructed to form a virtual image by projecting an image displayed on an intermediate screen 81 to a hologram combiner 83 on a front glass by a reflection mirror 82, the intermediate screen 81 may serve as the projection surface 7. Further, when the scanning image display apparatus is a projector, an arbitrary screen, a wall surface or the like may serve as the projection surface 7.

The display controller 4 controls emission intensity of the laser beam 2 emitted from the light source unit 1 and the drive controller 6 controls the drive of the scanning mirror 3. The display controller 4 and the drive controller 6 may be constructed, for example, by unillustrated CPU (Central Processing Unit), ROM (Read Only Memory) that stores a program, RAM (Random Access Memory) that stores the program and data at the time of performing various processes, input-output interfaces and a bus that connects these components.

As shown in FIG. 9, input display image data 9 are written and stored in the frame buffer 5 by a write logic 51. The display controller 4 calculates addresses of pixels of an image to be displayed based on a deflection direction of the beam derived from a drive signal of the scanning mirror 3, reads pixel data corresponding to the calculated addresses from the frame buffer 5 via a read logic 52, and modulates the emission intensity of the laser beam 2 from the light source unit 1 based on the read pixel data. A desired image can be displayed by this modulation of the emission intensity by the display controller 4.

Specifically, the display image data 9 are temporarily stored frame by frame in the frame buffer 5. Then, the display controller 4 reads the image data from the frame buffer 5, generates display data used to modulate the intensity of the laser beam, for example, at a frame frequency of 60 Hz based on the read image data, and causes the light source unit 1 to emit the laser beam 2 intensity-modulated based on the display data. Note that this operation is described in detail later.

The scanning mirror 3 is a two-axis resonant mirror which is resonantly driven in two directions, that is, in a horizontal direction (first direction) and a vertical direction (second direction), and is constructed such that a scanning beam forms a Lissajous pattern. In other words, the drive controller 6 resonantly drives the scanning mirror 3 in the two directions of the horizontal direction (first direction) and the vertical direction (second direction), and controls the drive of the scanning mirror 3 so that the laser beam 2 forms the Lissajous pattern. Normally, scanning is performed at a high speed in the horizontal direction and at a low speed in the vertical direction, but this may be reversed.

The scanning mirror 3 is typically an MEMS device structured as shown in FIG. 2. A mirror portion 21 is supported by a supporting portion 22 and held rotatably relative to an intermediate frame 23. The intermediate frame 23 is held rotatably relative to a fixed frame 25 by a supporting portion 24. A piezoelectric device, an electrostatic device, an electromagnetic device and the like may be employed to drive the scanning mirror 3, and various structures for the supporting portions have been developed depending on the driving methods. The scanning mirror of this embodiment is not limited to the one having specific structure and driving method, but scanning mirrors having various structures and driving methods may be employed.

The scanning mirror 3 can be realized to be a small device by being resonantly driven. For example, electrostatically driven MEMS devices in which comb electrodes are provided between the mirror portion 21 and the intermediate frame 23 and between the intermediate frame 23 and the fixed frame 25 have been developed to have a size of 10 mm×10 mm and resonant frequencies of about 10 kHz to 20 kHz and 200 Hz to 2 kHz. Further, piezoelectric devices in which movable portions are resonated by forming piezoelectric films on supporting portions have also been developed to have similar size and resonant frequencies.

FIG. 3 are plan views showing traces of beams scanned by the scanning mirror. FIG. 3(a) shows a trace of a half cycle of a slower frequency and FIG. 3(b) shows a trace of several cycles of the slower frequency.

Since the scanning mirror 3 is resonantly driven in two axes and the laser beam is scanned in a so-called Lissajous pattern, a scanning line is in the form of a sine curve and the laser beam is vertically scanned while laterally reciprocating in the case where the scanning in the horizontal direction is fast. Scanning in one way in the lateral direction corresponds to a half cycle of a faster frequency and scanning in one way in the vertical direction corresponds to the half cycle of the slower frequency.

Accordingly, as shown in FIG. 3(a), the laser beam vertically scans the screen once while laterally reciprocating during the half cycle of the slower frequency. How often the laser beam laterally reciprocates during this time, is determined based on a ratio of the faster frequency and the slower frequency. By repeating vertical screen scanning many times while changing the phase, clearances of the traces are filled up and the entire screen is scanned as shown in FIG. 3(b).

Figure 10:
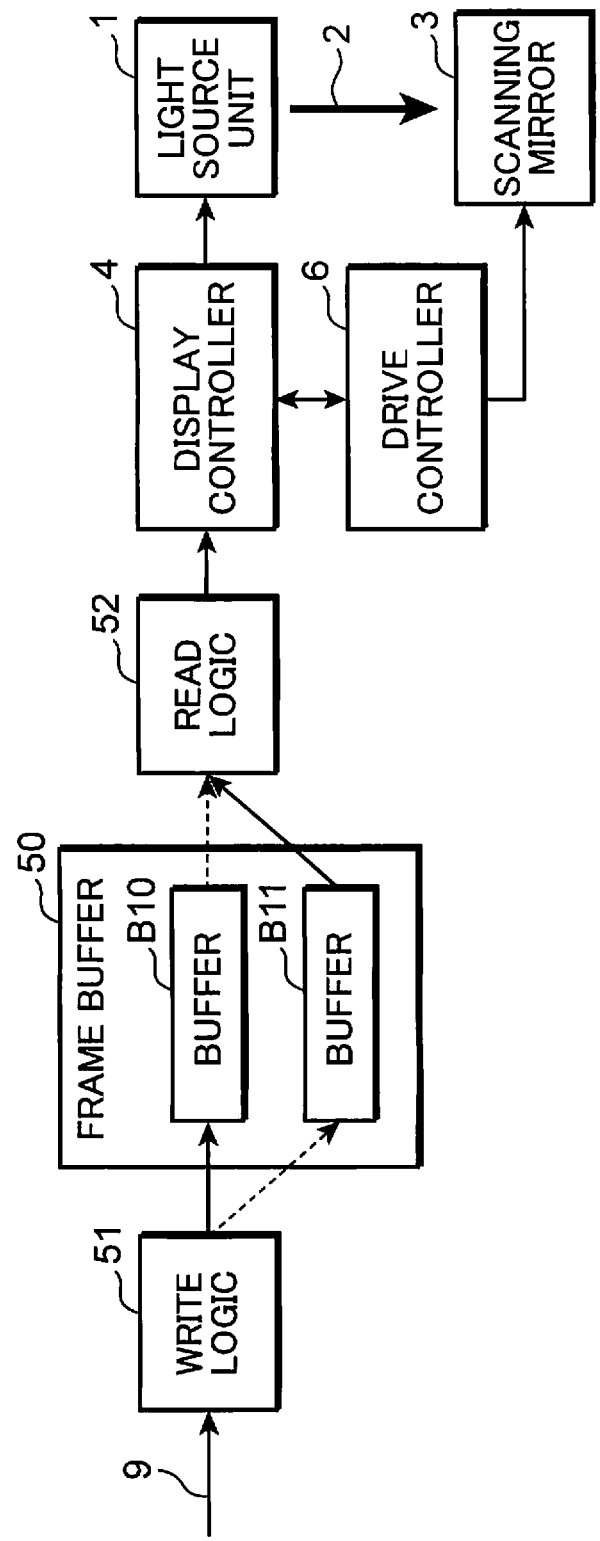
FIG. 10 is a block diagram showing another control construction of the scanning image display apparatus.

Next, the setting of the drive frequencies (scanning frequencies) of the scanning mirror is described. FIG. 4 are charts showing the operation of a conventional scanning image display apparatus. FIG. 4(a) shows a case where the scanning frequencies and a frame frequency are synchronized and FIG. 4(b) shows a case where the scanning frequencies and the frame frequency are not synchronized. FIG. 10 is a block diagram showing another control construction of the scanning image display apparatus. As shown in FIG. 10, a frame buffer 50 of this scanning image display apparatus has a double buffer configuration including separate frame buffers B10, B11 for reading and writing.

Since a scanning interval is widest in a central part of a scanning area in display by Lissajous scanning, the scanning frequencies are so set that the scanning interval in this part becomes a display resolution.

For example, as disclosed in patent documents 1 and 2, if a resolution is VGA (640×480), a frame rate is 60 Hz, and a round scanning frequency A=30 Hz, a faster frequency fh is:

$$fh > \pi N v A/2 = 22608 \text{ Hz} \quad \text{(Equation 1), and}$$

the faster frequency fh and the slower frequency fv can be selected to be:

$$fh = 30 \times 757 = 22710 \text{ Hz}$$

$$fv = 30 \times 34 = 1020 \text{ Hz}.$$

If the scanning mirror is accurately driven at the above frequencies, scanning is so performed that the trace of the laser beam returns to an original point in a cycle of 30 Hz and is followed in a reverse direction in a cycle of 60 Hz. Thus, scanning can be synchronized with the frame rate of the input image data as shown in FIG. 4(a). In other words, the round scanning frequency is 30 Hz.

In this case, the input moving image data are stored in the frame buffers B10, B11 and alternately written and read. In this way, moving images can be displayed by smoothly reading the moving image data continuously input at the frame rate of 60 Hz while writing them.

However, it is difficult to manufacture the scanning mirror such that the resonant frequencies thereof accurately coincide with the above values. Thus, for example, if the faster frequency fh becomes 236168.4 Hz and the slower frequency fv becomes 1060.8 Hz, based on the relations:

$$fh = 31.2 \times 757 = 236168.4 \text{ Hz}$$

$$fv = 31.2 \times 34 = 1060.8 \text{ Hz, the round scanning frequency } A \text{ is:}$$

$$A = 31.2 \text{ Hz}.$$

Then, as shown in FIG. 4(b), the scanning cycle and the frame rate do not coincide. Thus, the frames are switched during screen scanning and frame boundaries appear on the screen. Particularly, the discontinuity of the images is notably visible on the screen with quick and rushed movements.

Figure 5:
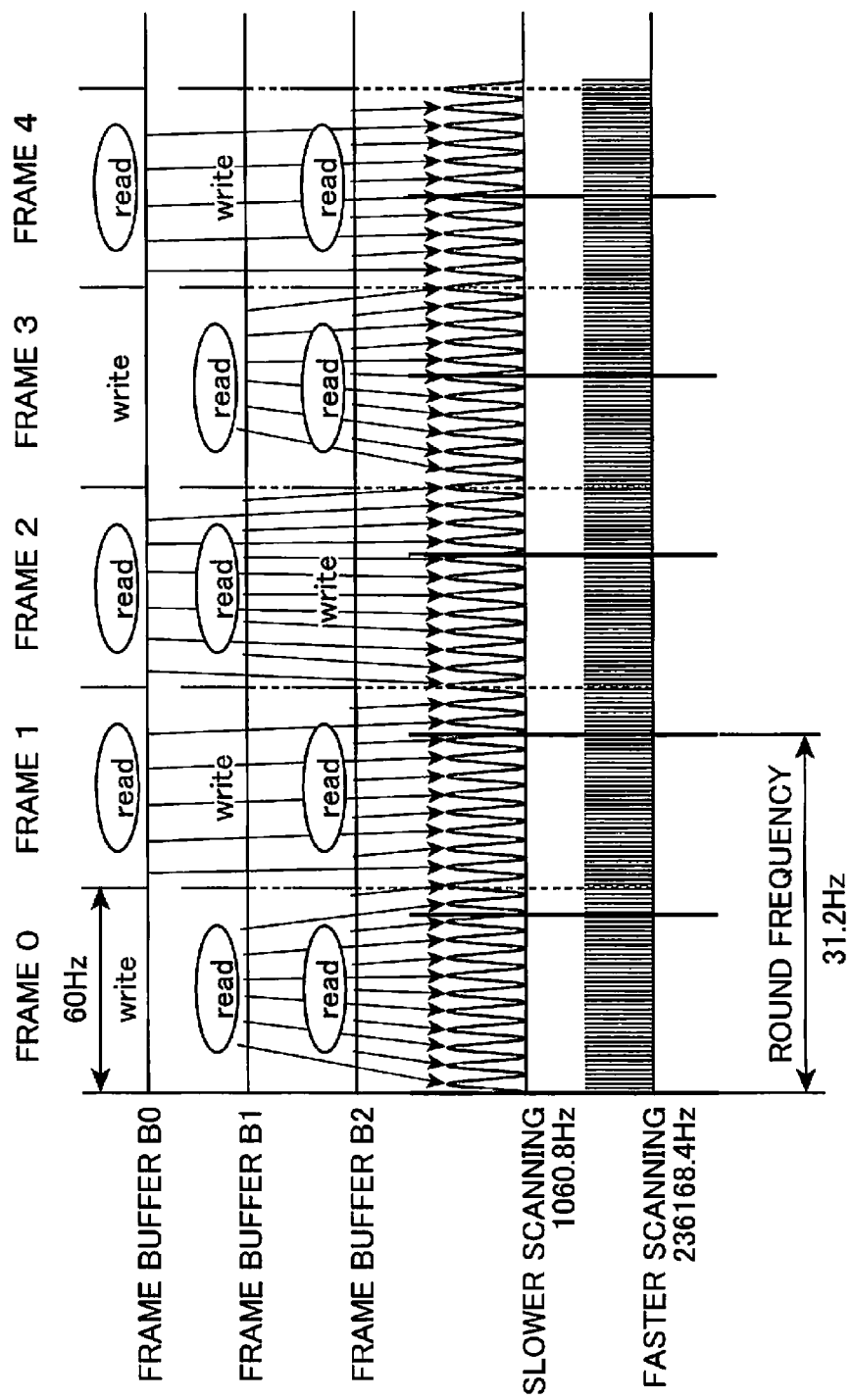
FIG. 5 is an explanatory chart showing the operation of the scanning image display apparatus according to the first embodiment of the invention.

Accordingly, in the first embodiment of the present invention, a display method is elaborated as follows to make the discontinuity of images inconspicuous. FIG. 5 is a chart showing the operation of the scanning image display apparatus according to the first embodiment of the present invention.

In FIGS. 5 and 9, the frame buffer 5 has a triple frame buffer configuration including frame buffers B0, B1 and B2 so that data in two frames other than a write frame can be read. Similar to the above, the scanning mirror 3 has a faster frequency fh and a slower frequency fv as resonant frequencies:

$$fh = 31.2 \times 757 = 236168.4 \text{ Hz}$$

$$fv = 31.2 \times 34 = 1060.8 \text{ Hz,}$$

the drive controller 6 resonantly drives the scanning mirror 3, and a round scanning frequency A is:

$$A = 31.2 \text{ Hz}.$$

Here, in FIG. 5, data is being written in the frame buffer B0 and image data in the frame buffers B1, B2 are accessible in the interval of a frame 0. Accordingly, in the first embodiment, the data in the frame buffers B1, B2 are alternately read and displayed, in synchronization with the slower scanning cycle for example. That is, the data of the adjacent frames are displayed in a superimposition manner on the entire screen at a high speed.

In other words, in FIG. 5, the image data are written in the frame buffers B0, B1 and B2 in this order in each frame interval. In the interval of the frame 0, the image data is being written in the frame buffer B0, and the image data already written in the frame buffers B1, B2 can be read. For example, the display controller 4 reads the image data already written in the frame buffer B1 during one cycle of the slower scanning, reads the image data already written in the frame buffer B2 during the subsequent cycle, and reads the image data already written in the frame buffer B1 again during the subsequent cycle. In this way, the image data already written in the frame buffers B1, B2 are alternately read in every cycle of the slower scanning until the interval of the frame 0 is completed.

Then, the display controller 4 generates display data used to modulate the intensity of a laser beam based on the image data read from the frame buffers B1, B2 and causes the light source unit 1 to emit a laser beam 2 intensity-modulated based on the display data. By this, the respective images corresponding to the image data in the frame buffers B1, B2 temporally adjacent one after the other are displayed in a superimposition manner on the projection surface 7 at a high speed.

When the interval of the frame 0 is completed, the interval of a frame 1 is subsequently started. In the interval of the frame 1, the image data is being written in the frame buffer B1, and the image data already written in the frame buffers B2, B0 can be read. For example, the display controller 4 reads the image data already written in the frame buffer B2 during one cycle of the slower scanning, reads the image data already written in the frame buffer B0 during the subsequent cycle, and reads the image data already written in the frame buffer B2 again during the subsequent cycle. In this way, the image data already written in the frame buffers B2, B0 are alternately read in every cycle of the slower scanning until the interval of the frame 1 is completed.

Then, the display controller 4 generates display data used to modulate the intensity of a laser beam based on the image data read from the frame buffers B2, B0 and causes the light source unit 1 to emit a laser beam 2 intensity-modulated based on the display data. By this, the respective images corresponding to the image data in the frame buffers B2, B0 temporally adjacent one after the other are displayed in a superimposition manner on the projection surface 7 at a high speed.

In this way, one frame buffer in which image data is to be written is switched in each frame interval and, accordingly, two frame buffers from which the already written image data can be read are switched. While writing image data in one of the frame buffers B0, B1 and B2 of the frame buffer 5, the display controller 4 alternately reads image data already written in the other two frame buffers in synchronization with the slower scanning and displays images corresponding to the respective image data on the projection surface 7 at a high speed while switching them.

If the image data read from the two frame buffers are switched, for example, in every half cycle of the slower scanning, the frame of the image data displayed on the projection surface 7 is switched every time the projection surface 7 is scanned by the laser beam 2 once in one way in the vertical direction. Further, if the image data read from the two frame buffers are switched, for example, in every cycle of the slower scanning, the frame of the image data displayed on the projection surface 7 is switched every time the projection surface 7 is scanned by the laser beam 2 once in reciprocation in the vertical direction. Regardless of whether the frame is switched in every half cycle or every cycle of the slower scanning, frame switching boundaries of the image data do not appear on the projection surface 7 displaying the images.

In how many cycles of scanning the frame is to be switched can be arbitrarily selected. To prevent the frames of the image data from being switched during the display of the screen on the projection surface 7, the display controller 4 may switch the frame buffers from which the image data are to be read in n cycles or (n−0.5) cycles (n=1, 2, 3, ... ).

By doing so, the discontinuity of the screen which is frame boundaries is not visible at a specific position as compared with the case where the frames are switched during the display of the screen as shown in FIG. 4(b).

By the construction as described above, according to the first embodiment, it can be prevented that the frame boundaries appear at a specific position by displaying adjacent frames in a mixed manner on the entire screen using the scanning mirror 3 that is resonantly driven in two axes even if the scanning cycle and the frame rate do not perfectly coincide.

Specifically, in this first embodiment, the frame buffer 5 includes the frame buffers B0, B1 and B2 and is configured such that, while image data is being written in one frame buffer, image data in two other frame buffers temporally adjacent one after the other can be read from these frame buffers. Further, the display controller 4 alternately switches the frame buffers of the frame buffer 5 from which the image data are read in synchronization with n cycles or (n−0.5) cycles (n is a positive integer).

Accordingly, even if the frame frequency and the scanning frequencies are not synchronized, the intervals of the frames and the round scanning cycle are not aligned and the frames are switched during scanning as shown in FIG. 5, there is no likelihood that the frame boundaries appear on the projection surface 7 displaying the images since the read frame buffers of the frame buffer 5 are alternately switched in synchronization with n cycles or (n−0.5) cycles. As a result, good images can be displayed even if the frame frequency and the scanning frequencies are not in synchronization.

In the first embodiment, the image data in the frame buffer B1 and those in the frame buffer B2 are alternately read with the same frequency, that is, in the same cycle in the interval of the frame 0 shown in FIG. 5 for instance. However, the present invention is not limited to this and they may be alternately read, for example, with different frequencies, that is, in different cycles.

Specifically, the display controller 4 may change the process for generating display data, for example, to read the temporally forward image data in the frame buffer B1 once and the temporally backward image data in the frame buffer B2 successively twice by switching the frame buffers B1, B2 from which the image data are read in the order of B1, B2, B2, B1, B2, B2 in every cycle of the slower scanning, in the interval of the frame 0 shown in FIG. 5 for instance. That is, a reading ratio from the frame buffers B1, B2 may be changed from 1:1 to, for example, 1:2. A change of the reading ratio is not limited to a ratio of integral multiples of one cycle. For example, image data may be read from the frame buffer B2 for one cycle after image data is read from the frame buffer B1 for a half cycle and this may be repeated.

In other words, the display controller 4 may alternately switch the frame buffers of the frame buffer 5 from which the image data are read while alternately changing "n" in every n cycles or (n−0.5) cycles. Further, the display controller 4 may alternately switch the frame buffers of the frame buffer 5 from which the image data are read while alternately using n cycles and (n−0.5) cycles in every n or (n−0.5) cycles.

In this way, images can be suitably displayed by making a rate of reading image data from the newer frame higher than a rate of reading image data from the temporally older frame.

The process for generating the display data is changed above by alternately reading from the frame buffers with different frequencies. However, how to change the process for generating the display data of two adjacent frames is not limited to alternate reading with different frequencies.

In the interval of the frame 0 shown in FIG. 5 for example, the display controller 4 may change the process for generating the display data so as to relatively reduce the intensity of a laser beam representing the temporally forward image data in the frame buffer B1 more than that of a laser beam representing the temporally backward image data in the frame buffer B2 with respect to the intensity of a laser beam based on the image data when the display data is generated from the image data. Since this makes the intensity of the laser beam 2 in the newer frame relatively higher than that of the laser beam 2 in the temporally older frame, images can be suitably displayed.

Further, in the interval of the frame 0 shown in FIG. 5 for example, the display controller 4 may detect a moved amount of an image based on the temporally forward image data in the frame buffer B1 and the temporally backward image in the frame buffer B2 and may change the intensities of the laser beams 2 or the reading ratio from the frame buffers according to this moved amount. Specifically, if the moved amount is, for example, equal to or above a predetermined level, the intensities of the laser beams 2 corresponding to the temporally forward frame buffer B1 and the temporally backward frame buffer B2 may be set at 1:2 or the reading ratio from the frame buffers may be set at 1:2. Further, if the moved amount is, for example, below the predetermined level, the intensities of the laser beams 2 corresponding to the temporally forward frame buffer B1 and the temporally backward frame buffer B2 may be set at 1:1 or the reading ratio from the frame buffers may be set at 1:1. This can reduce a slight overlap of video images caused by mixing of the frames particularly when movements are quick and rushed between the frames.

Although the image data in two frame buffers are constantly alternately read in the first embodiment, the present invention is not limited to this and the reading method may be switched, for example, between still images and moving images. In other words, a control may be executed to alternately read image data in two frame buffers as in the first embodiment in the case of moving images, whereas the control of the first embodiment may not be executed in the case of still images.

Specifically, the display controller 4 detects a moved amount of an image based on the temporally forward image data in the frame buffer B1 and the temporally backward image data in the frame buffer B2 and determines whether the image is a moving image or a still image based on this detection result. When the image is determined to be a moving image, the display controller 4 executes the control to alternately read image data in two frame buffers as in the first embodiment. On the other hand, when the image is determined to be a still image, the display controller 4 executes a normal control, that is, the control described with reference to FIG. 4 without executing the control shown in FIG. 5.

According to this embodiment, in the case of a still image, a frame boundary is not viewed by a user even if it appears on the projection surface 7 displaying the image. Thus, there is no likelihood of reducing image quality. Further, since a process load of the display controller 4 is reduced, power consumption can be reduced.

Second Embodiment

Next, a second embodiment of the present invention is described. In liquid crystal televisions and the like, interpolation frames are generated from input image data and displayed by driving a liquid crystal panel at a double speed, thereby improving a performance.

Such a method could not be employed for scanning image display apparatuses since it is difficult to drive a scanning mirror at a double speed or higher. However, what is equivalent to this can be realized if the method of the first embodiment is applied.

Figure 6:
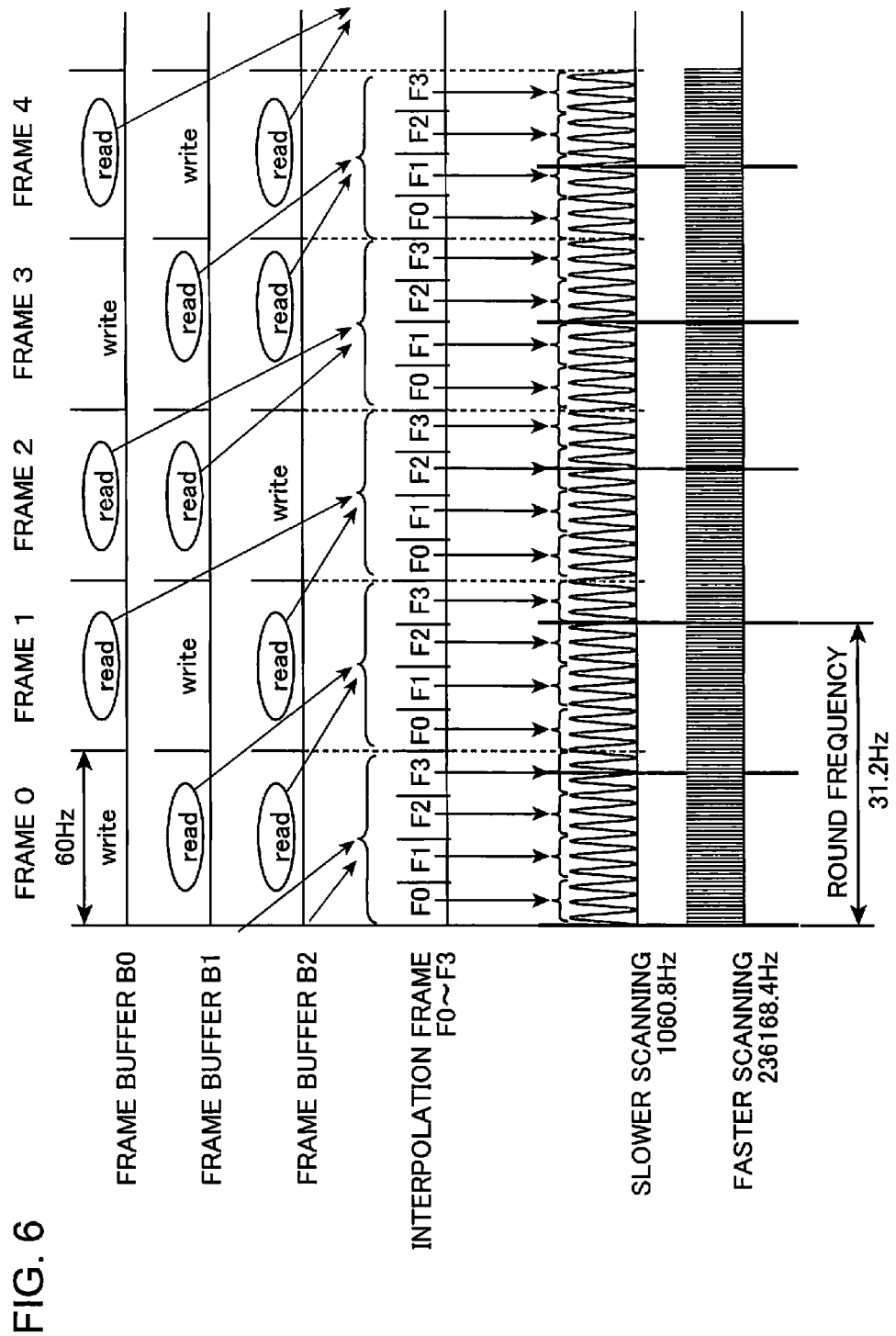
FIG. 6 is an explanatory chart showing the operation of a scanning image display apparatus according to a second embodiment of the invention.

FIG. 6 is a chart showing the operation of a scanning image display apparatus according to the second embodiment of the present invention. Note that the construction of the second embodiment is the same as that of the first embodiment shown in FIGS. 1 and 9.

In FIG. 6, in the same configuration as in FIG. 5, interpolation frames are generated from two frame data of frame buffers. For example, in the interval of a frame 0, interpolation frames F0 to F3 are generated from data in frame buffers B1, B2. These are successively displayed in the interval of a subsequent frame 1 in synchronization with a slower scanning frequency of a scanning mirror 3.

Specifically, in the interval of the frame 0 in FIG. 6, a display controller 4 generates the interpolation frame F0 with the image data in the frame buffer B1, generates the interpolation frame F3 with the image data in the frame buffer B2, and generates image data in the interpolation frames F1, F2 by interpolating the respective image data in the frame buffers B1, B2. Then, in the interval of the subsequent frame 1, the display controller 4 successively displays the image data in the interpolation frames F0 to F3 while switching them in synchronization with the scanning cycle of the slower scanning.

In the second embodiment, cycles of the slower scanning frequency of a scanning mirror 3 in a cycle of a frame frequency of 60 Hz are 1060.8/60=7.68 cycles since a slower frequency fv is:
fv=1060.8 Hz. Thus, each of the interpolation frames F0 to F2 is displayed for four cycles and the interpolation frame F3 is displayed for five cycles for instance.

The display cycles may be set such that:
the interpolation frame F0 is displayed for 4.5 cycles,
the interpolation frame F1 is displayed for 4 cycles,
the interpolation frame F2 is displayed for 4.5 cycles, and
the interpolation frame F3 is displayed for 4 cycles.
Note that no display may be made for a fraction, that is, 0.68 cycles by turning off the laser.

Alternatively, the display cycles may be set such that:
the interpolation frame F0 is displayed for 4.5 cycles,
the interpolation frame F1 is displayed for 4 cycles,
the interpolation frame F2 is displayed for 4.5 cycles, and
the interpolation frame F3 is displayed for 4.5 cycles,
and no display may be made for a fraction, that is, 0.18 cycles by turning off the laser.

In other words, the display controller 4 displays the interpolation frames F0 to F3 for n cycles or (n−0.5) cycles (n is a positive integer) by switching the interpolation frames to be displayed in synchronization with a scanning cycle. Then, the display controller 4 controls a light source unit 1 to turn off a laser beam 2 for a fractional cycle below 1 cycle or 0.5 cycles.

By doing so, the frames are not switched at an intermediate position of the screen. Further, by displaying the interpolation frames F0 to F3, moving images can be more smoothly displayed without increasing drive frequencies (scanning frequencies) of the scanning mirror 3.

By the construction as described above, according to the second embodiment, it becomes possible to prevent frame boundaries from appearing at a specific position and to further improve a moving image performance without increasing the scanning frequencies themselves, by displaying the interpolation frames F0 to F3 using the scanning mirror 3 that is resonantly driven in two axes, even if the scanning cycle and the frame rate do not perfectly coincide.

Specifically, in this second embodiment, the frame buffer 5 includes the frame buffers B0, B1 and B2 and is configured such that, while image data is being written in one frame buffer, image data of two frames temporally adjacent one after the other can be read from the other two frame buffers. Further, the display controller 4 generates the interpolation frames F0 to F3 using the respective image data temporally adjacent one after the other and read from the two frame buffers. Furthermore, the display controller 4 switches the interpolation frames F0 to F3 to be displayed in synchronization with the scanning cycle and displays the respective interpolation frames F0 to F3 for n cycles or (n−0.5) cycles (n is a positive integer).

Accordingly, even if the frame frequency and the scanning frequencies are not synchronized, the frame interval and the round scanning cycle are not aligned, and the frames are switched during scanning as shown in FIG. 6, the interpolation frames F0 to F3 used for generation of display data are successively switched in synchronization with n cycles or (n−0.5) cycles, whereby the frame boundaries do not appear on the projection surface 7 displaying the images. As a result, good images can be displayed even if the frame frequency and the scanning frequencies are not in synchronization.

Since the interpolation frames F0 to F3 are generated from the image data of two frames temporally adjacent one after the other in this second embodiment, moving images can be more smoothly displayed without increasing the scanning frequencies of the scanning mirror 3.

Although the image data of the two frames temporally adjacent one after the other are used as the interpolation frames F0, F3 and the two interpolation frames F1, F2 are generated as interpolation frames of the two adjacent frames in the above second embodiment, the number of the interpolation frames to be generated is not limited to two and may be one, three or more.

Although the two-axis scanning mirror that singly two-dimensionally scans is used in the above first and second embodiments, two single-axis scanning mirrors may be used. In other words, the two-axis resonant MEMS mirror capable of two-axis scanning by one chip as shown in FIG. 4 is exemplary illustrated in the above respective embodiments. However, a single-axis scanning MEMS mirror may be used for driving in each of a faster scanning direction and a slower scanning direction.

Although the display controller 4 switches the read frame buffers in synchronization with the slower scanning cycle out of scanning in the horizontal direction (first direction) and the vertical direction (second direction) of the scanning mirror 3 in the above first and second embodiments, the present invention is not limited to this. That is, the display controller 4 may switch the read frame buffers in synchronization with the scanning cycle of the faster scanning out of scanning in the horizontal direction (first direction) and the vertical direction (second direction) of the scanning mirror 3. In other words, the read frame buffers may be alternately switched in synchronization with n cycles or (n−0.5) cycles of the faster scanning.

If the read frame buffers are switched in synchronization with the scanning cycles of the faster scanning in this way, images of two adjacent frames to be displayed are more frequently switched than in the case of synchronization with the scanning cycles of the slower scanning. In other words, the images of the two adjacent frames are more finely mixed. This is preferable since the switch of the images can be made more inconspicuous to a user.

On the other hand, if the read frame buffers are switched in synchronization with the scanning cycles of the slower scanning as in the above first and second embodiments, the display process for the frame switch is less frequently performed than in the case of synchronization with the scanning cycles of the faster scanning. Thus, a time required for the display process can be shortened, with the result that power consumption required for the display process can also be reduced.

In the above first and second embodiments, the frame buffer 5 includes the frame buffers B0, B1 and B2 separately used for data reading and writing and is configured such that, while image data is being written in one frame buffer, image data can be read from the other two frame buffers. However, as long as data can be read from a buffer at the same time as data is being written in this buffer, the frame buffer 50 with a double buffer configuration including two buffers B10, B11 as shown in FIG. 10 may be used.

Although the drive controller 6 controls the scanning mirror 3 such that the laser beam 2 forms the Lissajous pattern in the above first and second embodiments, the present invention is not limited to this. In other words, the drive controller 6 may control the scanning mirror 3 so as to perform two-dimensional scanning in the first direction and in the second direction that crosses the first direction. However, if the scanning mirror 3 is so controlled that the laser beam 2 forms the Lissajous pattern, a control process of the drive controller 6 can be easily performed.

Further, the above first and second embodiments are effective, in particular, when the scanning mirror 3 is driven at the resonant frequencies both in the horizontal direction and the vertical direction, and the resonant frequencies are not accurately synchronized with the frame frequency due to problems in manufacturing.

Further, in the above first and second embodiments, specific numerical values are examples and values are not limited thereto.

The specific embodiments or examples for carrying out the invention are merely to clarify the technical content of the present invention, the present invention should not be narrowly interpreted by being limited to such specific examples and various changes can be made without departing from the spirit of the present invention and the scope as claimed below.

The specific embodiments described above mainly include inventions having the following constructions. Specifically, a scanning image display apparatus according to one aspect of the present invention includes: a light source unit that emits a laser beam; a scanning mirror that two-dimensionally scans the laser beam in a first direction and in a second direction that crosses the first direction at predetermined scanning frequencies, respectively; a frame buffer that temporarily stores image data corresponding to images to be displayed on a display screen frame by frame; and a display controller that reads the image data from the frame buffer, generates display data used to modulate an intensity of the laser beam at a predetermined frame frequency using the read image data, and causes the light source unit to emit the laser beam intensity-modulated based on the display data, wherein the frame buffer is so configured that the respective image data of a plurality of different frames can be temporarily stored therein and read therefrom, and the display controller reads the respective image data of the plurality of frames from the frame buffer and alternately switches the frames of the image data used for generation of the display data in synchronization with a scanning cycle of the scanning mirror.

According to this construction, the image data corresponding to the images to be displayed on the display screen are temporarily stored frame by frame in the frame buffer. The display controller reads the image data from the frame buffer and generates the display data used to modulate an intensity of the laser beam at the predetermined frame frequency using the read image data, and the laser beam intensity-modulated based on the display data is emitted from the light source unit. Further, the laser beam is two-dimensionally scanned in the first direction and in the second direction that crosses the first direction at the predetermined scanning frequencies respectively.

Here, the frame buffer is configured such that the image data of the plurality of different frames can be temporarily stored therein and read therefrom. The display controller reads the respective image data of the plurality of different frames from the frame buffer and alternately switches the frames of the image data used for generation of the display data in synchronization with the scanning frequency of the scanning mirror.

Therefore, even if the frame frequency and the scanning frequencies of the scanning mirror are not synchronized, the frames of the image data used for generation of the display data are alternately switched in synchronization with the scanning cycle of the scanning mirror, and accordingly, frame boundaries do not appear on the display screen displaying the images. As a result, good images can be displayed.

In the above scanning image display apparatus, the display controller preferably alternately switches the frames of the image data used for generation of the display data in synchronization with n cycles or (n–0.5) cycles (n is a positive integer) of a faster scanning out of the respective scanning frequencies of the scanning mirror in the first and in the second directions.

According to this construction, the frames of the image data used for generation of the display data are alternately switched in synchronization with n cycles or (n–0.5) cycles (n is a positive integer) of a faster scanning out of the respective scanning frequencies of the scanning mirror in the first and in the second directions. Thus, the frames of the image data are switched with high frequency. Therefore, the frame switch can be made more inconspicuous.

In the above scanning image display apparatus, the display controller preferably alternately switches the frames of the image data used for generation of the display data in synchronization with n cycles or (n–0.5) cycles (n is a positive integer) of a slower scanning out of the respective scanning frequencies of the scanning mirror in the first and in the second directions.

According to this construction, the frames of the image data used for generation of the display data are alternately switched in synchronization with n cycles or (n–0.5) cycles (n is a positive integer) of a slower scanning out of the respective scanning frequencies of the scanning mirror in the first and in the second directions. Thus, the frames of the image data are switched with low frequency. Therefore, a process for the frame switch can be less frequently performed. As a result, power consumption required for the process for the frame switch can be reduced.

In the above scanning image display apparatus, it is preferable that the frame buffer temporarily stores the respective image data of the plurality of frames which are two frames temporally adjacent one after the other including a temporally forward first frame and a temporally backward second frame, and the display controller reads the respective image data of the first and the second frames from the frame buffer and alternately switches the frames of the image data used for generation of the display data between the first frame and the second frame in synchronization with the scanning cycle of the scanning mirror.

According to this construction, the image data of the two frames temporally adjacent one after the other including the temporally forward first frame and the temporally backward second frame are temporarily stored in the frame buffer. The display controller reads the respective image data of the first and the second frames and alternately switches the frames of the image data used for generation of the display data between the first frame and the second frame in synchronization with the scanning cycle of the scanning mirror. Since the respective image data of the first and the second frames temporally adjacent one after the other are switched in this way, there is an advantage that the frame switch is inconspicuous to a user viewing the images displayed on the display screen.

In the above scanning image display apparatus, the display controller, in generating the display data from the image data, preferably changes a generation process for the display data such that the intensity of the laser beam representing the first frame is lower than that of the laser beam representing the second frame with respect to the intensity of the laser beam based on the image data.

According to this construction, in generating the display data from the image data, the generation process for the display data is changed such that the intensity of the laser beam representing the temporally forward first frame is lower than that of the laser beam representing the temporally backward second frame with respect to the intensity of the laser beam based on the image data. Thus, the images emphasizing the newer second frame can be suitably displayed.

In the above scanning image display apparatus, the display controller preferably changes a generation process for the display data such that the first frame is less frequently used for generation of the display data than the second frame. According to this construction, since the generation process for the display data is changed such that the first frame is less frequently used for generation of the display data than the temporally backward second frame, the images emphasizing the newer second frame can be suitably displayed.

In the above scanning image display apparatus, the display controller preferably detects a moved amount between the first and the second frames based on the respective image data of the first and the second frames, and changes the generation process for the display data when the moved amount is equal to or above a predetermined level. According to this construction, the moved amount between the first and the second frames is detected based on the respective image data of the first and the second frames and the generation process for the display data is changed when the moved amount is equal to or above the predetermined level. Thus, even images with quick and rushed movements can be suitably displayed.

In the above scanning image display apparatus, the display controller preferably reads the respective image data of the first and the second frames from the frame buffer, generates image data of an interpolation frame that interpolates the first and the second frames from the respective image data, and switches the frames of the image data used for generation of the display data in an order of the first frame, the interpolation frame and the second frame in synchronization with the scanning cycle of the scanning mirror.

According to this construction, the respective image data of the first and the second frames are read from the frame buffer and the image data of the interpolation frame that interpolates the first and the second frames is generated from the respective read image data. Then, the frames of the image data used for generation of the display data are switched in an order of the first frame, the interpolation frame and the second frame in synchronization with the scanning cycle of the scanning mirror. Thus, more smooth images can be displayed without increasing the scanning frequencies of the scanning mirror by displaying the interpolation frame. Note that the number of the interpolation frame(s) to be generated is not limited and may be one, two or more.

In the above scanning image display apparatus, it is preferable that the scanning mirror is a resonant mirror, and the scanning frequencies in the first and the second directions are respectively set near resonant frequencies of the scanning mirror in the first and the second directions.

According to this construction, the scanning mirror is a resonant mirror and the scanning frequencies in the first and the second directions are respectively set near the respective resonant frequencies of the scanning mirror in the first and the second directions. Here, since it is difficult to manufacture the scanning mirror such that the resonant frequencies of the scanning mirror are accurately synchronized with the frame frequency, the resonant frequencies, that is, the scanning frequencies of the scanning mirror may not be synchronized with the frame frequency. If no measure is taken against this, there is a possibility that frame boundaries appear on the display screen displaying images. However, in this construction, the frames of the image data used for generation of the display data are alternately switched in synchronization with the scanning cycle of the scanning mirror. Thus, it is possible to prevent the frame boundaries from appearing on the display screen displaying the images.

In the above scanning image display apparatus, the scanning mirror preferably scans the laser beam in a Lissajous pattern. According to this construction, two-dimensional scanning of a laser beam can be suitably realized by a simple construction since the laser beam is scanned in a Lissajous pattern by the scanning mirror.

INDUSTRIAL APPLICABILITY

A scanning image display apparatus according to the present invention can be applied to image display apparatuses and display systems such as mobile projectors, spectacle-type HMDs and HUDs.

The invention claimed is:

1. A scanning image display apparatus, comprising:
   a light source unit that emits a laser beam;
   a scanning mirror that two-dimensionally scans the laser beam in a first direction and in a second direction that crosses the first direction at predetermined scanning frequencies, respectively;
   a frame buffer that temporarily stores image data corresponding to images to be displayed on a display screen frame by frame; and
   a display controller that reads the image data from the frame buffer, generates display data used to modulate an intensity of the laser beam at a predetermined frame frequency using the read image data, and causes the light source unit to emit the laser beam intensity-modulated based on the display data, wherein
   the display controller controls the scanning frequencies in the first and second directions not to be in synchronization with the frame frequency,
   the frame buffer is so configured that the respective image data of a plurality of different frames can be temporarily stored therein and read therefrom, and
   the display controller reads the respective image data of the plurality of frames from the frame buffer and alternately switches the frames of the image data used for generation of the display data in synchronization with a scanning cycle of the scanning mirror.

2. The scanning image display apparatus according to claim 1, wherein
   the scanning mirror is a resonant mirror, and
   the scanning frequencies in the first and the second directions are respectively set near resonant frequencies of the scanning mirror in the first and the second directions.

3. The scanning image display apparatus according to claim 1, wherein the scanning mirror scans the laser beam in a Lissajous pattern.

4. A scanning image display apparatus comprising:
   a light source unit that emits a laser beam;
   a scanning mirror that two-dimensionally scans the laser beam in a first direction and in a second direction that crosses the first direction at predetermined scanning frequencies, respectively;
   a frame buffer that temporarily stores image data corresponding to images to be displayed on a display screen frame by frame; and
   a display controller that reads the image data from the frame buffer, generates display data used to modulate an intensity of the laser beam at a predetermined frame frequency using the read image data, and causes the light source unit to emit the laser beam intensity-modulated based on the display data,
   wherein the display controller alternately switches the frames of the image data used for generation of the display data in synchronization with n cycles or (n−0.5) cycles (n is a positive integer) of a faster scanning out of the respective scanning frequencies of the scanning mirror in the first and in the second directions.

5. A scanning image display apparatus comprising:
   a light source unit that emits a laser beam;
   a scanning mirror that two-dimensionally scans the laser beam in a first direction and in a second direction that crosses the first direction at predetermined scanning frequencies, respectively;
   a frame buffer that temporarily stores image data corresponding to images to be displayed on a display screen frame by frame; and
   a display controller that reads the image data from the frame buffer, generates display data used to modulate an intensity of the laser beam at a predetermined frame frequency using the read image data, and causes the light source unit to emit the laser beam intensity-modulated based on the display data,
   wherein the display controller alternately switches the frames of the image data used for generation of the display data in synchronization with n cycles or (n−0.5) cycles (n is a positive integer) of a slower scanning out of the respective scanning frequencies of the scanning mirror in the first and in the second directions.

6. A scanning image display apparatus comprising:

a light source unit that emits a laser beam;

a scanning mirror that two-dimensionally scans the laser beam in a first direction and in a second direction that crosses the first direction at predetermined scanning frequencies, respectively;

a frame buffer that temporarily stores image data corresponding to images to be displayed on a display screen frame by frame; and a display controller that reads the image data from the frame buffer, generates display data used to modulate an intensity of the laser beam at a predetermined frame frequency using the read image data, and causes the light source unit to emit the laser beam intensity-modulated based on the display data, wherein the frame buffer temporarily stores the respective image data of the plurality of frames which are two frames temporally adjacent one after the other including a temporally forward first frame and a temporally backward second frame, and the display controller reads the respective image data of the first and the second frames from the frame buffer and alternately switches the frames of the image data used for generation of the display data between the first frame and the second frame in synchronization with the scanning cycle of the scanning mirror.

7. The scanning image display apparatus according to claim 6, wherein the display controller, in generating the display data from the image data, changes a generation process for the display data such that the intensity of the laser beam representing the first frame is lower than that of the laser beam representing the second frame with respect to the intensity of the laser beam based on the image data.

8. The scanning image display apparatus according to claim 6, wherein the display controller changes a generation process for the display data such that the first frame is less frequently used for generation of the display data than the second frame.

9. The scanning image display apparatus according to claim 7, wherein the display controller detects a moved amount between the first and the second frames based on the respective image data of the first and the second frames, and changes the generation process for the display data when the moved amount is equal to or above a predetermined level.

10. The scanning image display apparatus according to claim 6, wherein the display controller reads the respective image data of the first and the second frames from the frame buffer, generates image data of an interpolation frame that interpolates the first and the second frames from the respective image data, and switches the frames of the image data used for generation of the display data in an order of the first frame, the interpolation frame and the second frame in synchronization with the scanning cycle of the scanning mirror.

* * * * *